Jan. 10, 1933.  E. K. ZINK  1,894,211
BILGE LOG
Filed Dec. 26, 1928  5 Sheets-Sheet 1

EMMETT K. ZINK, INVENTOR;

BY Victor J. Evans, ATTORNEY.

WITNESSES

Jan. 10, 1933.   E. K. ZINK   1,894,211
BILGE LOG
Filed Dec. 26, 1928   5 Sheets-Sheet 2

EMMETT K. ZINK,
INVENTOR.

BY Victor J. Evans,
ATTORNEY.

WITNESSES

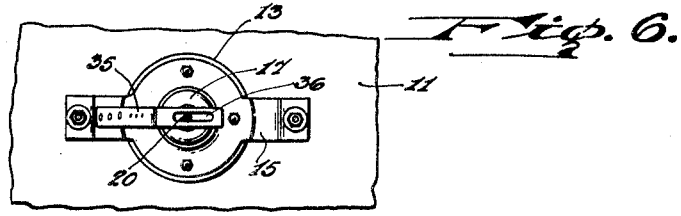
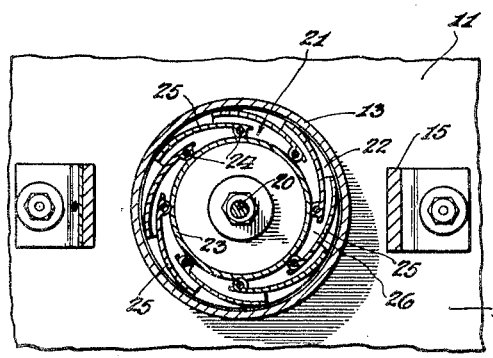
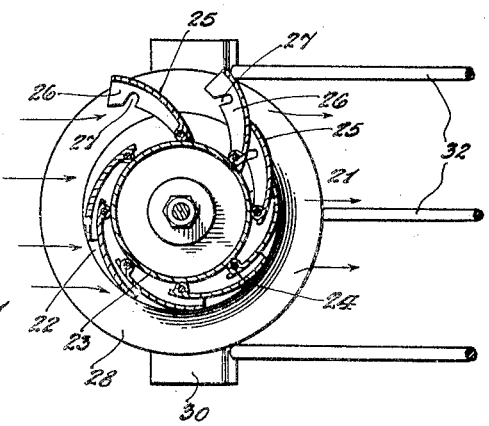
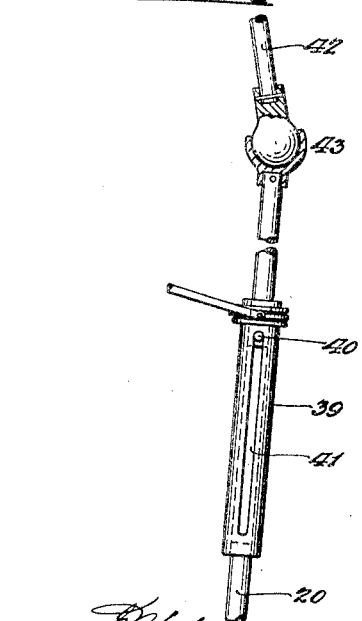
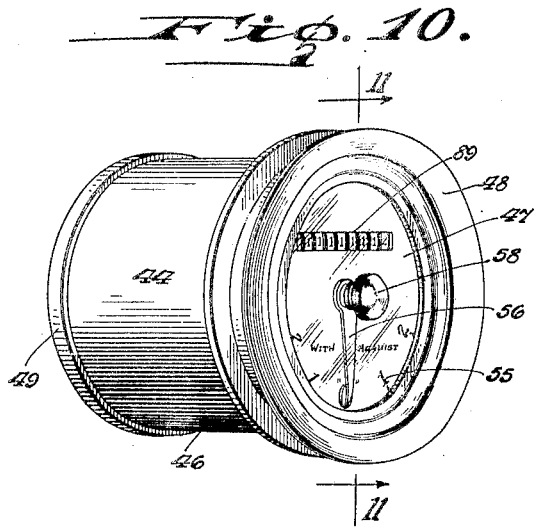

Jan. 10, 1933. E. K. ZINK 1,894,211
BILGE LOG
Filed Dec. 26, 1928 5 Sheets-Sheet 4
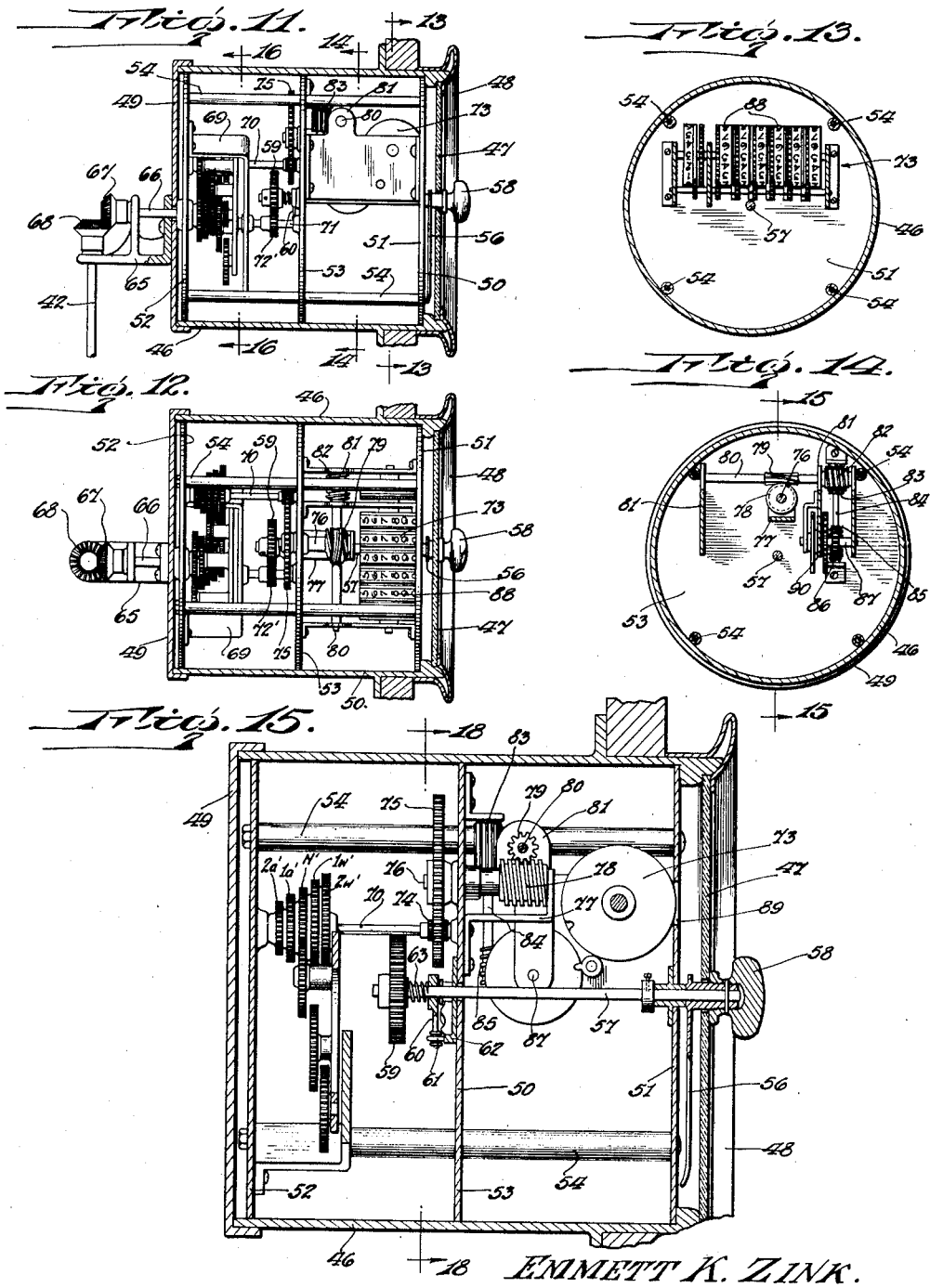
EMMETT K. ZINK. INVENTOR
BY Victor J. Evans ATTORNEY Jan. 10, 1933.  E. K. ZINK  1,894,211
BILGE LOG
Filed Dec. 26, 1928   5 Sheets-Sheet 5

EMMETT K. ZINK.
INVENTOR

BY Victor J. Evans
ATTORNEY

WITNESSES

Patented Jan. 10, 1933

1,894,211

UNITED STATES PATENT OFFICE

EMMETT K. ZINK, OF WEST SOMERVILLE, MASSACHUSETTS

BILGE LOG

Application filed December 26, 1928. Serial No. 328,595.

This invention relates to improvement in bilge logs for ships.

The primary object of the invention resides in a ship's instrument for accurately counting the number of knots or miles sailed by a ship over a course irrespective of whether the tide is running with or against the direction of travel of the ship, or whether the tide is weak, strong or high.

Another object of the invention is to provide a ship's log with suitable counting mechanism which may be regulated to compensate for tide variance to register the exact number of charted miles.

A further object of the invention is the provision of a ship's log embodying a register mechanism which may be mounted upon the instrument-board of motor boat, or in the chart-room of a larger craft within sight of the pilot of the ship which is a decided advantage over the use of the taffrail log now commonly used for the same purpose.

A still further object is to provide a ship's log which includes a rotator capable of being lowered into the water so as to be well under the surface at all times which reduces any possible slipping to a minimum, and which may be readily lifted within the ship's hull when at anchor to prevent the accumulation of mud and marine growth thereon.

With these and other objects in view, the invention resides in certain novel construction and combination and arrangement of parts, the essential features of which are hereinafter fully described, are particularly pointed out in the appended claims, and are illustrated in the accompanying drawings, in which:—

Figure 6 is a top plan view of the rotator mechanism.

Figure 7 is an enlarged horizontal sectional view on the line 7—7 of Figure 4.

Figure 8 is a similar view on the line 8—8 of Figure 5.

Figure 9 is a fragmentary detail side elevation of a portion of the drive shaft with the universal joint shown in section.

Figure 10 is a perspective view of the register device.

Figure 11 is a vertical longitudinal sectional view on the line 11—11 of Figure 10.

Figure 12 is a horizontal sectional view therethrough.

Figure 13 is a vertical transverse sectional view on the line 13—13 of Figure 11.

Figure 14 is a similar view on the line 14—14 of Figure 11.

Figure 15 is an enlarged vertical longitudinal sectional view on the line 15—15 of Figure 14.

Figure 1:
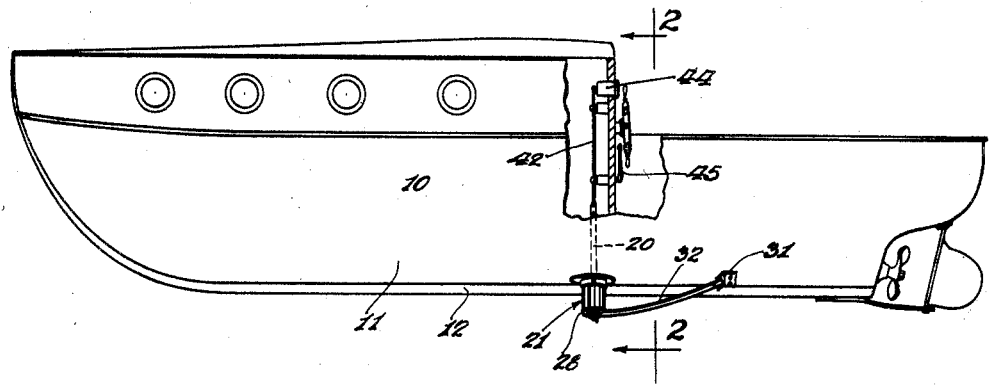
Figure 1 is a side elevation of a small ship with parts broken away in section and showing my improved bilge log installed thereon.
Figure 2:
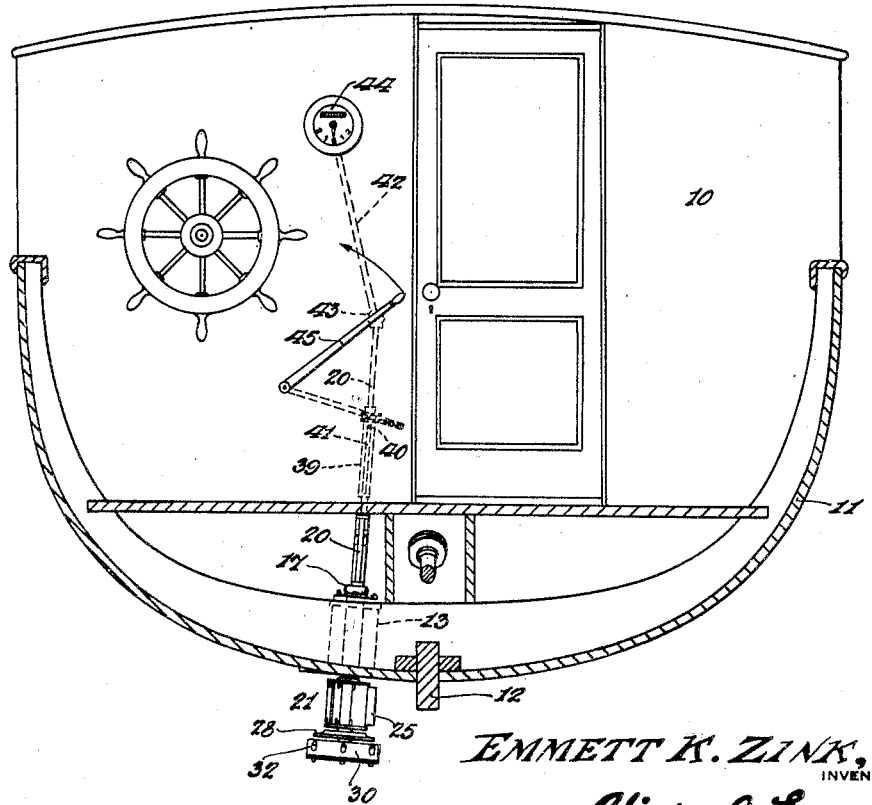
Figure 2 is a vertical transverse sectional view on the line 2—2 of Figure 1.
Figure 3:
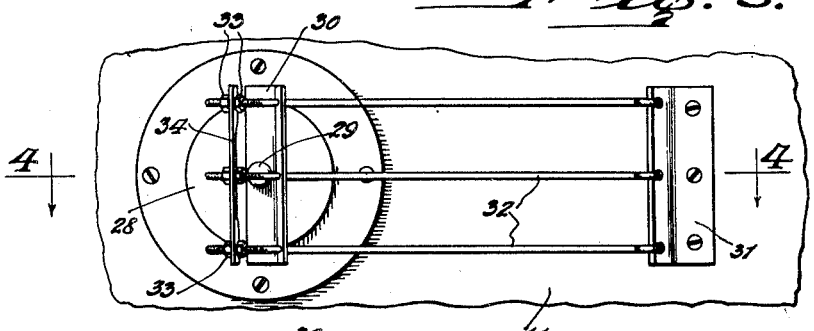
Figure 3 is a bottom plan view.
Figure 4:
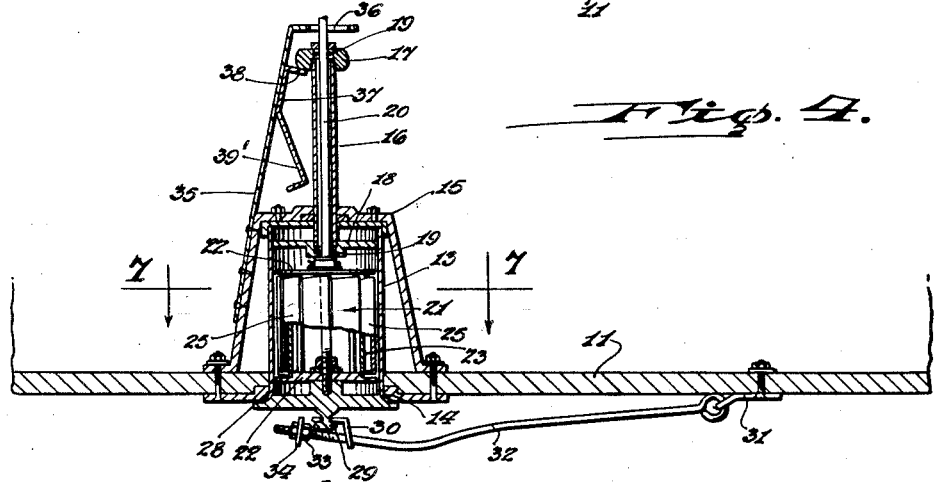
Figure 4 is a vertical longitudinal sectional view on the line 4—4 of Figure 3.
Figure 5:
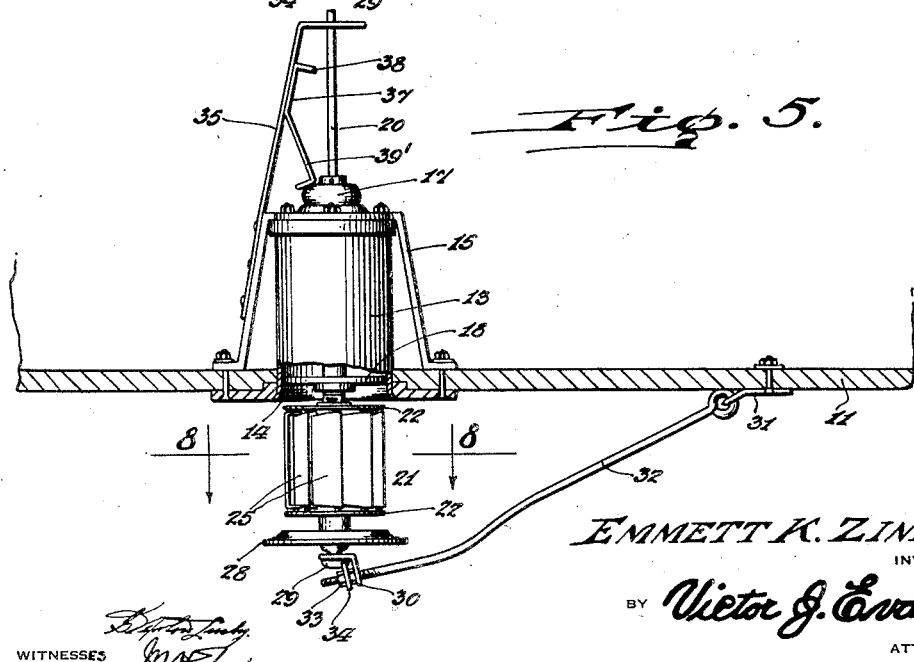
Figure 5 is a view similar to Figure 4 but showing the rotator in an extended position.
Figure 16:
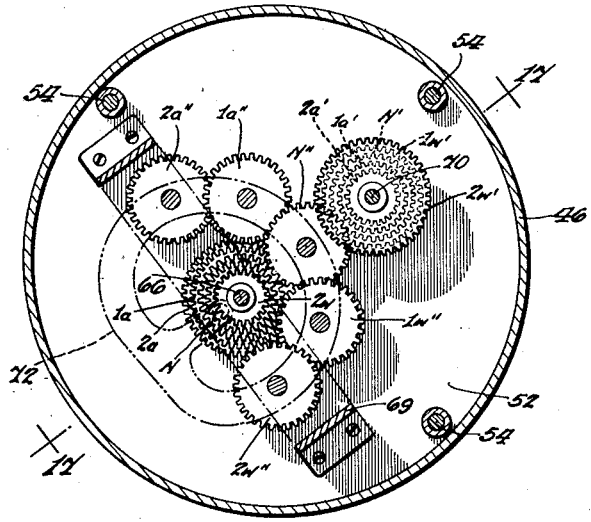
Figure 16 is an enlarged vertical transverse sectional view on the line 16—16 of Figure 11.
Figure 17:
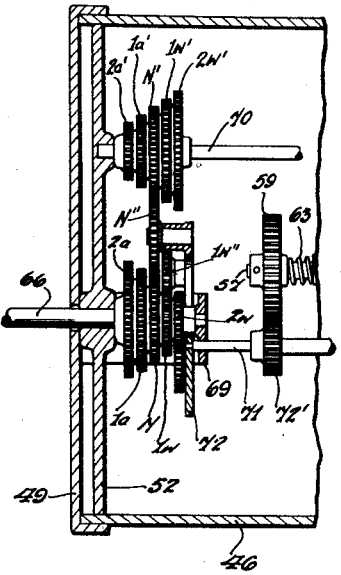
Figure 17 is a fragmentary longitudinal sectional view on the line 17—17 of Figure 16.
Figure 18:
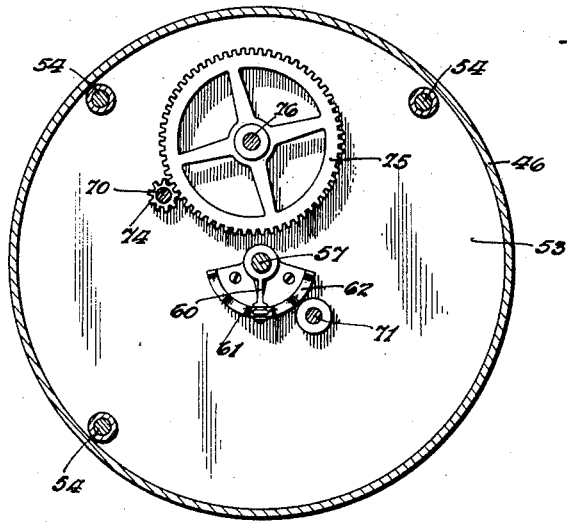
Figure 18 is a vertical transverse sectional view on the line 18—18 of Figure 15.
Figure 19:
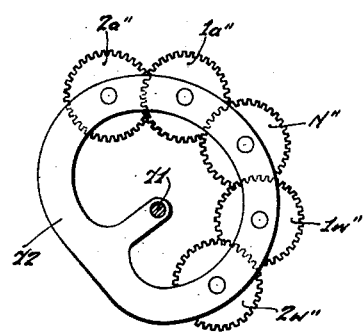
Figure 19 is a detail elevational view of the idler gears and their mounting.

Referring to the drawings by reference characters, the numeral 10 designates a boat or ship having a hull 11 provided with a keel 12 extending the length thereof. Mounted within the hull to one side of the keel 12 is a cylinder 13 having an open end which opens through the hull and which has a seat 14 about its peripheral edge. The cylinder is held rigid by a bracket 15 which bridges the top of the cylinder and is bolted to the hull as clearly shown in Figure 4 of the drawings. Slidably mounted in the top wall of the cylinder is a tubular sleeve 16 which carries a collar 17 at one end and a disk or plunger head 18 on its other end and which disk slidably engages the walls of said cylinder. Extending through the sleeve 16 and journalled in roller bearings 19 at opposite ends thereof is a drive shaft 20 which has a rotator 21 fixed to its lower end. The rotator 21 includes a pair of end disks 22 held in spaced relation by a cylindrical wall 23. The external diameter of the end disks 22 is slightly less than the internal diameter of the cylinder 13 to permit the rotator to freely slide in and out of the open end thereof. Journalled in the end disks are the opposed pintles or trunnions 24 of the curved propeller vanes or wings 25. The outer ends of the wings are wider than the inner ends while the top and bottom edges are turned inwardly to provide flanges 26 having aligned notches 27 therein to receive the trunnions of the next adjacent wing when the wings are in a collapsed position within the plane of the peripheral edge of the end disks. The wings overlap each other as clearly shown in Figures 7 and 8 of the drawings. The water pressure on one side of the axis of the rotator will tend to open the wings on that particular side while the water pressure on the opposite side of the axis will hold the wings in closed position. The force of the water acting upon the extended or open blades or wings will impart rotation to the rotator and its shaft 20. The extreme lower end of the shaft 20 is screw threaded to receive a closure cap 28 which screws tight against the lower end disk 22 of the rotator. The cap engages the seat 14 when the rotator is in a retracted position within the cylinder to seal the open end of the cylinder against the accumulation of mud and marine growth therein.

The underside of the cap 28 has a head or knob 29 extending centrally therefrom, on which an angle plate 30 is loosely mounted while pivoted to a plate 31 bolted to the hull are protecting rods 32. The rods 32 extend through the angle plate 30 and have their free ends screw threaded to receive clamping nuts 33 between which a connecting plate 34 is held. The rods 32 extend below the rotator to protect the same when striking bottom.

Fixed to one of the sides of the bracket 15 and rising thereabove is a spring 35 having its free end bent horizontally and provided with a slot 36 for the passage of the shaft 20. The inner side of the spring carries a member 37 having an upper outwardly bent terminal 38 and a lower inwardly bent terminal 39'. The terminals act as stops, the terminal 38 engaging beneath the collar 17 when the rotator is in a retracted position, while the terminal 39 engages the same when in an extended position, the spring 35 yielding to allow the terminal stops to snap in position.

The upper end of the shaft 20 slides into a tubular rod 39 and is keyed thereto by pins 40 which enter slots 41 in the side walls of the tubular rod. The top end of the rod is operatively connected to a shaft 42 by a universal joint 43 which shaft is in turn connected with a register instrument 44. However, before describing the register 44 in detail it might be well to explain that the shaft 20 is operatively connected to a bell crank lever 45, by the manual operation of which the rotator 21 may be lifted and lowered into and out of the cylinder 13.

The register 44 may be conveniently mounted in sight of the pilot of the ship on which it is installed and would most likely be placed upon instrument board of a small boat and within the pilot's cabin of a large ship. The register includes an outer cylindrical casing 46 which is closed at its front end by a glass panel 47 held in position by a rim 48 while a removable cover plate 49 fits upon the rear end to normally close the same but which may be removed to facilitate access to the inner working parts of the register which are insertible and removable as a single unit. The unit comprises a frame structure 50 which includes a front disk 51, rear disk 52, and an intermediate disk 53, all of which are held in spaced relation by fixed posts 54. The outer face of the front disk 51 is provided with a dial face or scale 55 embodying a "0" in vertical alignment with the axis of the disk, and the numerals 1 and 2 in spaced relation upon opposite sides of the vertical axis. The numerals on one side are identified by the word "With" and those on the opposite side by the word "Against". Movable over the dial is a pointer 56 keyed to a shaft 57 journalled in the disks 51 and 53. The hub of the pointer extends through a central opening in the glass panel 47 and projects exteriorly therefrom to fixedly receive a manipulating knob 58. By manual turning of the knob 58, the pointer may be brought to register with anyone of the indicating marks for a purpose to be presently explained.

The inner end of the shaft 57 terminates in the space between the disks 52 and 53 and carries a gear 59, while slidably keyed to the shaft is an arm 60 having a roller 61 journalled in its outer end for riding over an undulated cam 62 mounted on the disk 53. An expansion spring 63 is interposed between the gear 59 and the arm to urge the roller against the undulated surface of the cam. The cam is provided with five hollows or valleys in radial alignment with the indicating marks on the dial so that when the pointer is set to any of the marks, the shaft 57 will be held against accidental turning. The roller rides over the high spots of the cam when turning the shaft from one mark to another, as the spring 63 will yield under the sliding of the arm 60. The turning of the shaft 57 selectively controls the engagement and disengagement of variable speed transmission gears which will presently be described.

Journalled in a bracket 65 mounted on the exterior of the cover 49 and extending therethrough is a shaft 66, the exterior end of which has a bevel gear 67 fixed thereon which meshes with a similar bevel gear 68 carried by the top end of the shaft 42 whereby rotation from the rotator is transmitted to the driven shaft 66. The inner end of the shaft 66 also has its bearing in a bracket 69 mounted on the inside of the disk 52 and fixed to the shaft are variable gears 2a, 1a, N, 1w and 2w in the order named, the gear 2a being the largest in diameter and the gear 2w being the smallest in diameter.

A shaft 70 is journalled in the disks 52 and 53 and has a series of variable gears 2a', 1a', N', 1w' and 2w' respectively disposed on the same planes as the gears 2a, 1a, N, 1w and 2w but in spaced relation thereto. The gear 2a' is the smallest in diameter while the diameter of the others gradually increases toward the gear 2w' which is the largest in diameter. These respective aligned gears are adapted to be brought into coacting engagement with each other, but to operatively connect the same it is necessary to provide intermediate idler gears therefor which will now be described.

Journalled in the disk 53 and bracket 69 is a stub shaft 71 to which a gear mounting frame 72 is fixedly mounted, while journalled in the frame are idler gears 2a'', 1a'', N'', 1w'' and 2w'', all of which are of the same diameters but their axes are at different distances from the axis of the shaft 71. The gears 2a'', 1a'', N'', 1w'' and 2w'' are on the same plane as the respective aligned gears above mentioned and are adapted to be selectively brought into register therewith to effect a transmission therebetween. The idler gears are grouped in a manner so that upon disengagement of one of the idler gears from its co-acting gears, the next idler gear will begin meshing with its respective coacting gears, there being no lost motion during the disengagement of one set of gears and the engagement of another set.

The shaft 71 carries a gear 72'' which is in constant mesh with the gear 59 on the selector shaft 57, whereby turning movement upon the knob 58 will cause the respective sets of gears to be engaged to either speed up the drive to the knot or mile counter 73 or reduce the speed depending upon the run of the tide. When the pointer 56 registers with the 0 mark, the gears N, N' and N'' are in mesh and which represents a neutral position when the ship is travelling neither with nor against the tide. The parts have been shown in this position throughout the drawings.

For transmitting motion from the shaft 70 to the counter mechanism 73, I provide a gear 74 on the shaft 70 which has constant mesh with a larger gear 75 fixed to a shaft 76 journalled in the disk 53 and a bracket 77 mounted on one side thereof. The shaft 76 has a worm 78 mounted thereon for reducing the speed transmitted thereto by the shaft 70, and which worm has meshing engagement with a gear 79 provided on a transverse shaft 80 journalled in bearings 81. This shaft 80 also has a worm 82 mounted thereon which meshes with a gear 83 carried by a vertical shaft 84 which also has a worm 85 at its lower end, which worm meshes with a gear 86 mounted on a rotatable stub shaft 87. The register 73 hereinbefore mentioned is of the usual well-known construction and it is not believed necessary to go into detail explanation as to the construction thereof, other than to say that it includes rotatable disks or barrels 88 having numbers ranging from 0 to 9 thereon and which indicate the total mileage traveled and any fraction thereof. The counting disks are operable by the power taken from the shaft 87 which is transmitted from the rotator through the various reducing gearing and selective transmission gears. One horizontal row of numbers on the number disks 88 is displayed through a slot 89 in the end disk 51.

From the foregoing description, it will be seen that a ship travelling against a strong or weak tide, the indicating pointer may be moved to the desired position on the side of the dial marked "Against" and the transmission gearing is automatically adjusted to compensate for the increased number of revolutions of the rotator in proportion to the true speed of the ship. When a ship is running with the tide, the pointer is set on the side of the dial mark "With" and brought into registry with the proper mark depending upon the force of the tide. The selected transmission gears necessary to speed up the rotation of the register drive shaft are automatically engaged to compensate for the loss in revolutions of the rotator due to the aid of the tide in propelling the ship.

Power is transmitted from the rotator 21 to the coupled shafts 20 and 42, gears 68 and 67, shaft 66 to the selective meshed transmission gears, shaft 70, through gears 74 and 75 to shaft 76, worm 78 to gear 79, shaft 80 to shaft 84 through worm 82 and gear 83, and from shaft 84 to shaft 87 through worm 85 to gear 86. The shaft 87 is operatively connected with the drive mechanism 90 by which the counter disks 88 are turned.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is:—

1. In a ship comprising in combination a hull, a bilge log including a rotator comprising pivoted blades, means for suspending the rotator from the bottom of said hull, a register device mounted on said ship remote from said rotator, driving means operatively connecting said rotator to said register device, and selective control means for regulating the speed of said driving means to compensate for the speed and direction of tide to which said rotator is subjected during the travel of said ship in a body of water.

2. In a ship comprising in combination a hull, a bilge log including a rotator comprising pivoted blades and having a shaft slidably mounted in said hull for movement to a retracted position within and to an extended position exterior thereof, means connected to the hull for locking said rotator in either a retracted or extended position, a register device mounted on said ship remote from said rotator, driving means operatively connecting said rotator to said register device, and selective control means for regulating the speed of driving means to compensate for the speed and direction of tide to which said rotator is subjected during the travel of a ship in a body of water when said rotator is in an extended position.

3. In a ship comprising in combination a hull, a bilge log including a rotator comprising pivoted blades and having a shaft slidably mounted in said hull for movement to a retracted position within and to an extended position exterior thereof, means connected to the hull for locking said rotator in either a retracted or extended position, a register device mounted on said ship remote from said rotator, driving means operatively connecting said rotator to said register device, and selective control means for regulating the speed of said driving means to compensate for the speed and direction of tide to which said rotator is subjected during the travel of a ship in a body of water when said rotator is in an extended position, said means including aligned spaced sets of variable gears, and individual idler gears movable into engagement with the respective sets of variable gears.

4. In a bilge log having an open ended cylinder, and a rotator slidably mounted therein, said rotator including a plurality of pivoted wings movable to extended position and to a retracted position to allow the rotator to be moved into said cylinder.

5. In a bilge log having an open ended cylinder, and a rotator slidably mounted therein, said rotator including a plurality of pivoted wings movable to extended position and to a retracted position and coacting sealing means carried by said rotator for sealing the open end of said cylinder when said rotator is in a housed position therein.

6. In a bilge log, a register device including registering means, a driven rotatable shaft, a series of gears of different diameters and mounted on said shaft, a power take-off shaft, a series of gears of different diameters and mounted on said take-off shaft in alignment and in spaced relation to said first series of gears, idler gears for engagement with the respective aligned gears, means for selectively moving said idler gears into engagement with the aligned gears, said means including a turnable frame in which said idler gears are journalled, a turnable manipulating shaft operatively connected to said frame, a dial, and a pointer mounted on said manipulating shaft for traversing said dial for register with marks thereon to visibly denote the selected gears to be engaged, and driving means operatively connecting said power take-off shaft with said registering means.

7. In a ship comprising in combination a hull, said hull having an opening therein, externally positioned means rigid with the hull adjacent said opening a hollow cylinder positioned within the hull and mounted on the wall of the latter around said opening, a rotor depending below the hull, and movable into said cylinder, a closure for said cylinder and carried by said rotor, a plate mounted on said closure, and rods pivotally mounted on said external means and carried by said plate for protecting said rotor, said rods being slidable in said plate on upward movement of said rotor.

In testimony whereof I have affixed my signature.

EMMETT K. ZINK.